(12) United States Patent  (10) Patent No.: US 7,681,454 B2
Rogg  (45) Date of Patent: Mar. 23, 2010

(54) DEVICE AND PROCESS FOR CHECKING PLAY IN VEHICLE LINKAGES

(76) Inventor: Werner Rogg, Deutenbergring 63, D-78056 Villingen-Schwenningen (DE)

( * ) Notice: Subject to any disclaimer, the term of this patent is extended or adjusted under 35 U.S.C. 154(b) by 428 days.

(21) Appl. No.: 11/696,125

(22) Filed: Apr. 3, 2007

(65) Prior Publication Data
US 2007/0240487 A1    Oct. 18, 2007

(30) Foreign Application Priority Data
Apr. 4, 2006    (DE) .................. 10 2006 016 076

(51) Int. Cl.
*G01M 13/00*    (2006.01)
(52) U.S. Cl. ......................................................... 73/669
(58) Field of Classification Search .................... 73/669
See application file for complete search history.

(56) References Cited
U.S. PATENT DOCUMENTS

| 2,013,235 | A | | 9/1935 | Collins | |
|---|---|---|---|---|---|
| 3,902,352 | A | * | 9/1975 | Buzzi | ........................ 73/11.08 |
| 3,937,058 | A | * | 2/1976 | Hilbrands | .................. 73/11.08 |
| 4,658,656 | A | * | 4/1987 | Haeg | ............................ 73/669 |
| 4,989,455 | A | * | 2/1991 | Gomyo et al. | ................. 73/669 |
| 5,259,246 | A | * | 11/1993 | Stuyts | .......................... 73/669 |

FOREIGN PATENT DOCUMENTS

| AU | 1036870 | 7/1971 |
|---|---|---|
| DE | 19537158 | 4/1997 |
| DE | 19937124 | 2/2001 |
| WO | WO 92/20997 | 11/1992 |

* cited by examiner

*Primary Examiner*—Hezron Williams
*Assistant Examiner*—Rose M Miller
(74) *Attorney, Agent, or Firm*—Akerman Senterfitt; Peter A. Chiabotti

(57) ABSTRACT

A device (10, 10') for checking the play of linkages of vehicles is provided and can include a first device (20) for production of oscillations, which is connected, via an extension element (30), with a contact element (40) for contacting the device (10, 10') with the component to be tested, and a second device (50) for recording the oscillations produced in the component to be tested. A process for testing the play of vehicle linkages is also provided and can include the steps of producing oscillations with a first device (20), the oscillations being transmitted to a component to be measured via a contact element (40) which is connected via an extension element (30) with the first device (20), and recording the oscillations produced in the component to be measured with a second device (50).

15 Claims, 1 Drawing Sheet

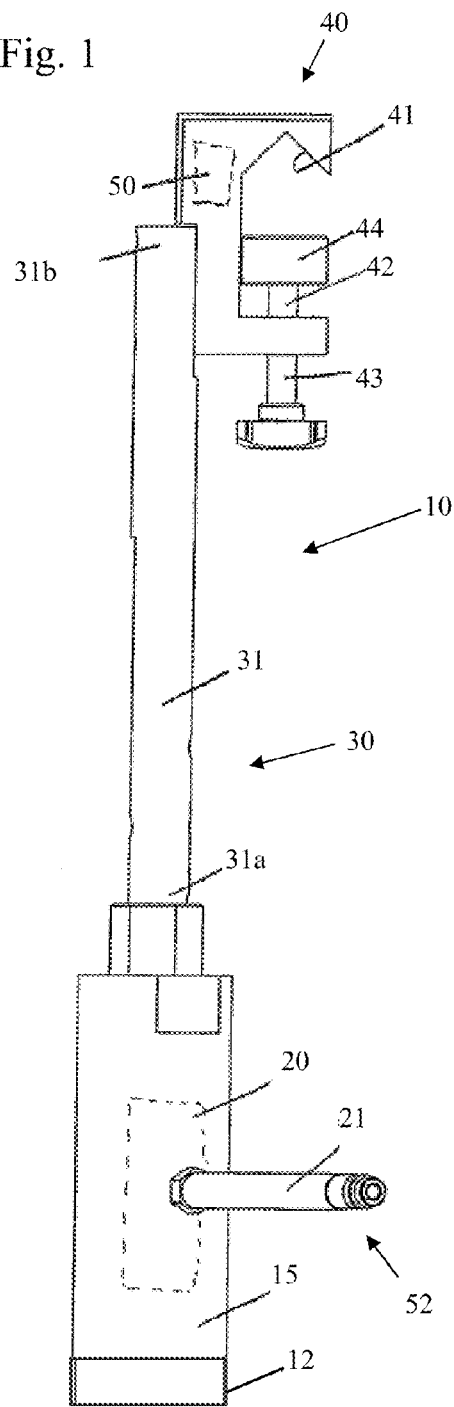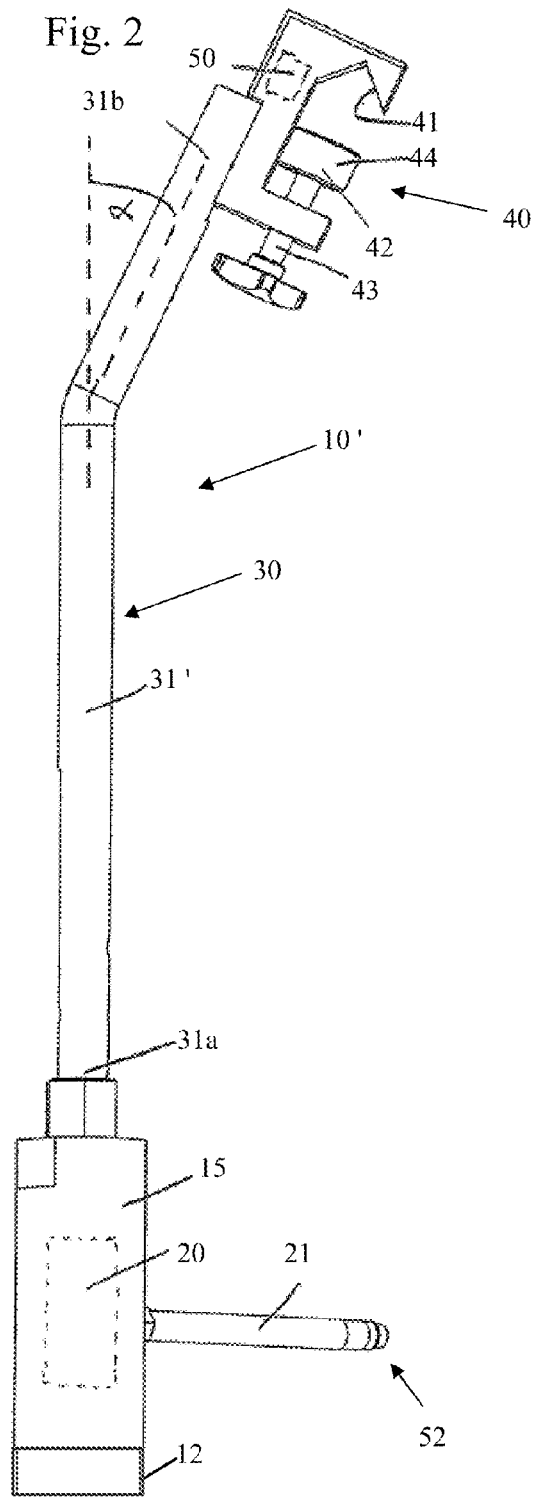

DEVICE AND PROCESS FOR CHECKING PLAY IN VEHICLE LINKAGES

FIELD OF THE INVENTION

The invention concerns a device and a process for checking free play in vehicle linkages.

BACKGROUND OF THE INVENTION

DE 20 35 102 A1 discloses a process and a device for determining defective or incorrectly mounted components in assemblies of motor vehicle power train systems, which involve driving the assembly with an associated motor at a constant speed of rotation at idle and to measure the running noise emitted by the revolving parts using a sensor secured releasably to a part of the assembly. Herein the sensor is provided at the housing of the assembly, since it is presumed that a defective or improperly assembled component would cause running noises, which would be transmitted to the housing. This process is however comparatively imprecise, since the entire assembly is caused to vibrate and a precise localization of the defective or incorrectly assembled component is difficult.

DE 199 37 124 A1 discloses a process and a device for testing the linkages of wheel suspension linkage systems of motor vehicles, in which a vibration motor is attached to at least one part of the wheel suspension linkage system, by means of which high frequency oscillations are imparted to the wheel suspension linkage system, wherein the linkage can then be checked in varying modes and manners. A disadvantage with this process or, as the case may be, this device, is that the entire wheel suspension linkage system must be caused to oscillate, for which a corresponding high-power motor is necessary. Further, even with this process a precise localization of a defective linkage is not readily possible. The defect could be recognized, for example, acoustically in the case that this linkage emits significant acoustic noise, or in that the test person checks the corresponding linkage by hand, in which defective linkages can be recognized by a pronounced shaking or rattling. A testing of this type is, however, associated with high error rates. In order to be able to attach the vibration motor to the wheel suspension linkage system, it is necessary to dismount the corresponding wheel from the vehicle. A wheel removal merely for testing the linkages is however laborious and time consuming.

SUMMARY

It is thus the task of the invention to provide an economical device for testing the free play of vehicle linkages, via which a defective linkage can be recognized reliably and simply, without requiring extensive component intervention.

Further, the invention is concerned with the task of providing a corresponding process for testing the play of vehicle linkages, which is simple to implement.

The inventive device for checking the play of vehicle linkages includes a first device for production of oscillations, which is connected via an extension element with an attachment element for attachment of the device to a component to be tested, and a second device for recording the oscillations produced by the component. The inventive device can thus be attached via the attachment element to any possible location of the vehicle, for example the wheel mount linkages or other torque transfer systems. Therewith, a location between two linkages or in the vicinity of a linkage to be tested can be specifically selected in order to cause oscillations primarily in this component. The oscillations produced in the component are directly measured by the second device in that the device is applied against or connected directly to the component, followed by a corresponding evaluation. The deflections of the component are proportional to the free play of the corresponding component, wherein free play can occur due to friction wear in, for example, the bearing of a swivel head, or in particular in the case of defective or incorrectly assembled components. A non-defective or a not incorrectly installed component, that is, a component with very little or no play, is hardly brought into oscillation. By comparison of the amplitude of the oscillations produced in the component, it can thus be determined whether this is a defective or a incorrectly assembled component, that is, a component with large free play. By the provision of the extension element between the first device for production of oscillations and the attachment element, it is in particular possible to reliably and specifically test even difficult to access components within the vehicle, without having to bring a large assembly of components into oscillation. As a result it is also possibly to employ a less powerful motor, since only specific, targeted components need be brought into oscillation.

In a particularly advantageous embodiment of the invention the device is a hand-held tool. Therewith, the device can be particularly simply manipulated and can also be positioned by hand into difficult to access areas of the vehicle.

The first device is preferably an eccentric motor, in order to therewith produce the oscillations in a particularly simple manner. Therein the motor is driven preferably either electrically, pneumatically or hydraulically. Compressed air is particularly suited for driving the motor of the first device, since in motor vehicle repair facilities compressed air hoses are generally available.

In an advantageous further development of the invention, the frequency and/or the amplitude of the motor is variable, and the frequency and the amplitude of the motor can also be simultaneously variable, in order to employ the device in the testing of components of varying dimensions. Therein the frequency of the motor is preferably varied between approximately 15 Hz and approximately 400 Hz.

In an advantageous embodiment of the invention, the first device is provided within a handgrip of the device, whereby the device is easy to manipulate by hand and no separate motor is required.

The extension element is preferably a rod. In this case, the first device is provided at a first free end of the rod and the attachment element at a second end of the rod, whereby it is made possible that the one end of the rod, which is in the form of a handgrip, can be held by the hand, while the attachment element at the other end of the rod can be attached to the appropriate component, which could in particular be at a difficult to access location within the motor vehicle. Herein a rod is particularly economical.

The rod is preferably straight or bent or angled or divided via a linkage. Thereby the device makes it possible to place the attachment element at the one end of the rod also in variously geometrically shaped assemblies within motor vehicles. In one advantageous embodiment of the invention, the attachment element exhibits a attachment contour, by means of which the attachment element can be placed against a component. In particular, if the same components are to be tested frequently, the attachment contour can correspond to the dimensions of the component, so that a form-fitting attachment surface is produced, whereby the attachment element can be held reliably on the corresponding component.

The attachment element preferably includes a clamp or fastening element, since in operation of the device the oscillations produced by the first device must be transmitted to the component, wherein there is the danger that the attachment element could slide off of the component. This is reliably prevented by a clamp or fastening element. Therein the fastening element could be, for example, clamping tongs, a screw mount, a magnetic holder, a vise-type holder or a bracket or collar. What is of importance herein is that the securing element can be attached simply and rapidly and thereafter again be released. As a rule the securing element is operated by hand; it is however, also conceivable that the securing element is driven electrically, pneumatically or hydraulically.

In a particularly preferred embodiment of the invention, the second device is provided in or on the extension element or the attachment element. Preferably the second device is provided as close as possible to that part of the device which comes into contact with the component, in order to record as reliably as possible the oscillations produced in the component.

For detection of oscillations of the component the second device is preferably an accelerometer, particularly preferably a two-axis accelerometer, in order to be able to detect oscillations along at least one, preferably however along two, axis.

Preferably the accelerometer has a variable reaction time, whereby the responsivity can be varied, and the response behavior of the second device be paired with the frequency of the first device.

In order to display oscillations produced in the component, which are detected by the second device, the second device is connected to an amplitude display, preferably an oscilloscope. Particularly preferred is to have the second device connected with the amplitude display via a radio link or a cable, in order to transmit data detected by the second device from the inside of the vehicle to the amplitude display in a particularly simple manner.

Preferably, the amplitude display includes an optical and/or acoustic, digital and/or analog output device in which the amplitudes of the oscillations produced on the component can be directly displayed.

Depending upon the size of the measured component it could be necessary to vary the mass of the device, which could be accomplished for example by attachment of supplemental weights to the device.

The inventive process for testing the free play of vehicle linkages comprises first producing oscillations in a first device, which oscillations are transmitted by means of an attachment element, which is connected via a extension element with the first device, to a component to be measured, and wherein subsequently by means of a second device the oscillations produced in the component are recorded.

BRIEF DESCRIPTION OF THE DRAWINGS

The invention is described in greater detail on the basis of the following figures. There is shown in:

FIG. 1. a perspective view of a first illustrative embodiment of a device for testing the free play of vehicle linkages, and FIG. 2 a perspective view of an illustrative embodiment of a device for testing the free play of vehicle linkages.

DETAILED DESCRIPTION OF THE PREFERRED EMBODIMENTS

FIG. 1 shows an first illustrative embodiment of the device 10 for testing the free play of vehicle linkages with a first device 20 for production of oscillations, which is connected via an extension element 30 with an attachment or a contact element 40 for attachment of the device 10 to a component to be measured, and a second device 50 for recording the oscillations produced in the component.

The first device 20 is located in the hand grip 15 of the device 10 shaped as a handheld apparatus. The first device 20 is shown herein indicated only with dashed lines. The first device 20 can, in this case, be, for example, an eccentric motor, in particular a reciprocating piston engine, and can be driven electrically, pneumatically or hydraulically. In a pneumatic drive the compressed air is supplied via a compressed air connector 52 located on the handgrip 15. Herein the frequency and/or the amplitude of the motor of the first device 20 is preferably variable, and the frequency and the amplitude of the motor can also be simultaneously variable, for example via a not shown governor, which for simplicity of operation is likewise located on the hand grip 15. The frequency of the motor is therein controllable between approximately 15 Hz and approximately 400 Hz, for example by regulating the drive pressure. Via the amplitude of the motor, the strength of the impulses of the device 10, which are transmitted onto the component to be measured, are varied in order to match the oscillations optimally to the component to be measured.

The extension element 30 is a rod 31 with a first end 31*a* and a second end 31*b*. Therein the handgrip 15, in which the first device 20 is situated, is provided on the first end 31*a* of the rod. In the embodiment shown in FIG. 1 the rod 31 is a straight cylindrical solid rod, which is made for example of steel.

On the second end 31*b* of the rod 31 of the extension element 30 the contact element 40 is provided, which preferably includes a contact shape 41 adapted for mating the contact element to the component to be measured. Via the contact shape 41 a form-fitting connection can already be formed between the contact element 40 and the component to be measured. Since however strong oscillations are to be transmitted to the component, and there is the danger that the contact element 40 can slip off from the component, the contact element 40 includes a securing element 42 which in the illustrated case is a screw mount with a screw 43 and a clamp element 44. Upon screwing in the screw 43, the clamp element 44 is displaced in the direction of the contact shape 41 and clamps the component to be measured between the clamp element 44 and the contact shape 41. Alternatively, clamp jaws, a magnetic mount —wherein a permanent magnet or an electrical magnet can be employed, vise mounts or brackets or collars can be used as the securing device.

The second device 54, recording the oscillations produced in the component, is located in the contact element 40, alternatively however could be provided on the contact element, or in the vicinity of the second end 41*b* of the rod 31 of the extension 30. The second device 50 is shown on the figures only as a dashed line. The placement of the second device 50 on the end 31*b* of the rod 31 opposite to the first device 20 brings about that the second device is located as close as possible to the component caused to oscillate, so that the oscillations produced in the component are reliably detected by the second device 50. For this, the second device 50 is an accelerometer, in particular, a two axis accelerometer, in order to be able to record oscillations in axis which are perpendicular to each other.

In the case of variations of the frequency of the first device 20, it is necessary to also match the accelerometer and its sensitivity to the frequency of the first device 20, for which the accelerometer of the second device 50 has a variable reaction time.

The second device 50 is connected to a not shown amplitude display, for example an oscilloscope or a computer, wherein the connection is realized either by a cable running in the device 10 or a radio interface or port. The second device 50 therewith transmits the oscillations recorded at the component directly to the amplitude display, where it is displayed optically and/or acoustically, digitally and/or analog, and can also be directly evaluated. An optical or graphic output can be an analog signal displayed on the oscilloscope or a digital value for the maximal amplitude, or could also be in the form of a display in green for "not defective" or red for "defect" when the recorded oscillations are directly evaluated. The magnitude of the amplitude, which is displayed for example on the oscilloscope, depends upon the frequency of the motor of the first device 20 and the sum of the mass of the rod 31 between the first device 20 and the second device 50. Which frequencies of the first device 20 or masses of the rod 30 lead to the greatest amplitudes, can be determined empirically by tests. For this, it is advantageous when the mass of the device, in particular the mass of the rod 31, is variable. For this, for example, supplemental weights 12 can be added to the hand grip 15 in order to change the weight of the device 10, whereby the frequency or the amplitude of the oscillations transmitted to the component can be influenced.

In FIG. 2, a second embodiment of the device 10' for checking the free play of vehicle linkages is shown. Identical parts of the device 10' are given the same reference numbers as the corresponding parts of the device 10.

The device 10' differs from the device 10 shown in FIG. 1 only by the design of the extension element 30. This is in the form of a rod 31 wherein the second end 31b of the rod 31' is bent at an angle α relative to the longitudinal axis. Thereby it is also possible to bring the attachment element into contact with difficult to access components within a component assembly.

The device 10' makes it possible to directly transmit the oscillations produced in the first device directly to the component of a component group to be tested via the contact element 40 provided on the extension element 30, without having to bring the entire component group into oscillation. On the one hand it is possible therewith to directly measure even difficult to access component parts of a component assembly, as a result of which the motor of the first device 20 can be dimensioned smaller, since only individual components and no longer the complete component assembly must be brought in to oscillation. In addition to this, the location of the defects can be targetedly detected. By appropriate selection of frequency of the first device 20 the measured components are brought in to oscillation, whereby a deflection is produced which represents a value for free play of the corresponding component or, as the case may be, the corresponding linkage holding the component.

REFERENCE NUMBER LIST 10 device
10' device
12 supplemental or add-on weights
15 handgrip
20 first device
21 air hose connection
30 extension element
31 rod
31' rod
31a first end
31b second end
40 contact element
41 contact shape
42 securing device
43 screw
44 clamp element
50 second device
α angle The invention clamed is:

1. A checking device for checking the play of linkages of vehicles, comprising:
   a first device for producing oscillations, which is connected via an extension element with a contact element for contacting the checking device with a component to be tested;
   a second device for recording the oscillations produced in the component to be tested; and
   wherein the checking device is in the form of a hand-held device.

2. The checking device according to claim 1, wherein the first device (20) is an eccentric motor.

3. The checking device according to claim 2, wherein the frequency and/or amplitude of the motor is variable.

4. The checking device according to claim 3, wherein the frequency of the motor is variable between 15 Hz and 400 Hz.

5. The checking device according to claim 1, wherein the extension element is a rod.

6. The checking device according to claim 5, wherein the rod is straight, bent or angled.

7. The checking device according to claim 1, wherein the contact element includes a contact shape.

8. The checking device according to claim 1, wherein the second device is provided in the contact element.

9. The checking device according to claim 1, wherein the second device is an accelerometer.

10. The checking device according to claim 9, wherein the acceleration sensor is a one or two axis accelerometer.

11. The checking device according to claim 9, wherein the accelerometer has a variable reaction time.

12. A checking device for checking the play of linkages of vehicles, comprising:
   a first device for producing oscillations, which is connected via an extension element with a contact element for contacting the vehicular device with a component to be tested;
   a second device for recording the oscillations produced in the component to be tested; and
   wherein the first device is located in a hand grip.

13. A checking device for checking the play of linkages of vehicles, comprising:
   a first device (20) for producing oscillations, which is connected via an extension element (30) with a contact element (40) for contacting the vehicular device with a component to be tested;
   a second device (50) for recording the oscillations produced in the component to be tested; and
   wherein the contact element includes a securing device.

14. The checking device according to claim 13, wherein the securing device is a screw mount.

15. A checking device for checking the play of linkages of vehicles, comprising:
   a first device for producing oscillations, which is connected via an extension element with a contact element for contacting the vehicular device with a component to be tested;
   a second device for recording the oscillations produced in the component to be tested; and
   wherein the mass of the extension element is variable.

* * * * *